UNITED STATES PATENT OFFICE.

F. MARQUARD, OF RAHWAY, NEW JERSEY.

IMPROVEMENT IN THE MANUFACTURE OF WHITE RUBBER.

Specification forming part of Letters Patent No. 51,332, dated December 5, 1865; Reissue No. 2,179, dated February 20, 1866.

*To all whom it may concern:*

Be it known that I, FRANK MARQUARD, of Rahway, Union county, State of New Jersey, have invented certain new and useful improvements in the method or process of treating india-rubber, gutta-percha, or other gums of like properties to harden them, so as to imitate ivory, pearl, coral, enamel, woods of various kinds, and other substances used in the arts and manufactures; and I do hereby declare that the following is a full description of the same.

The nature of my improvements consists, first, in the method or process of treating the gum when dissolved in chloroform (or other solvent) with a current of strong caustic-ammonia gas, for the purpose of bleaching the gum; second, in subjecting the material thus bleached to a thorough washing in hot water, to free it from the caustic-ammonia gas; third, in subjecting the dissolved and bleached gum to a distilling process at a low temperature, either while in the washing process or by a subsequent process, for the purpose of freeing it from the chloroform, which by suitable condensers is collected and used over again as a solvent for the gum; fourth, in the redissolving the gum or product obtained from the foregoing operations in chloroform, and combining with it pure phosphate of lime or carbonate of zinc to give body and hardness to the compound when it has been subjected to pressure in hot molds and dried.

To describe my improvements more particularly, I will refer to the following method or process I have practiced in making the hard-rubber compound.

I first take about two pounds of the pure india-rubber or other gum and dissolve it in about thirty-two pounds of chloroform. Other solvents may be used, though I prefer chloroform. When the gum has been thoroughly dissolved in any properly-constructed digester, I next charge the solution with a strong caustic-ammonia gas, so as to thoroughly saturate it. The object of this is to bleach the rubber or other gum used. A treatment with chloride of ammonia might be used, but do not consider it to act as thoroughly as a bleaching agent on the rubber or other gum used as the caustic-ammonia gas. When the gum has been thoroughly bleached, which is ascertained by frequent inspection and testing, the charging with the gas is suspended, and the solution removed to a boiler or other suitable vessel having an agitator in it, and there subjected to a washing process with hot water until the gum is entirely freed from the caustic ammonia. This is effected by means of a thorough and constant agitation of the solution. At the same time that the washing process is carried on, the degree of heat in the boiler may be increased to about 176° Fahrenheit grade—the evaporating-point of chloroform—to distill or evaporate it from the gum, when it may be collected in any suitable condensers, to be used over again as a solvent for the gums. It will be obvious that the distilling operation may be carried on also subsequently to the washing process; but whether carried on simultaneously or separately the object is the same, to wit: first, to free the gum from the chloroform at this stage of the process, and, second, to economize the cost of the manufacture by saving one of the ingredients for subsequent use, which it is not practicable to do by any other known process used for like purposes. The product thus obtained from the distillation of the gum is then strained, pressed, and dried. It is then redissolved in a small quantity of chloroform to a consistency of a thick paste, and mixed with finely-prepared pure phosphate of lime or carbonate of zinc in such proportions as to give a body to it, and having the appearance of slightly-dampened meal, in which condition it is subjected to the requisite degree of pressure in a hot mold, to give the mass coherence and expel the chloroform. With a sufficient degree of pressure this is effected at once, and the compound may be put in the lathe or other mechanism to be worked and shaped into all manner of forms and devices.

It will be obvious that the articles thus formed would be white; but to make articles to imitate coral, pearl, enamel, and woods of various kinds it will only be necessary to mix any of the various colored dry pigments with the compound at the time of mixing the phosphate of lime with the gum.

One of the special peculiarities of my invention over all others previously known for similar purposes is the economical use of the materials. By my improvements I dispense with the costly article of alcohol, used by Engelhard and Haveman in their process patented November 22, 1859. I collect and reuse the chloroform as a solvent, and, lastly, I redissolve and use over again all the chips, turnings, and filings made in the process of manufacturing the various artcles of use and ornament from my improved hard-rubber or gum compound.

Having now described my improved process for making hard-rubber or gum compounds of a similar character or properties, I will proceed to set forth what I claim and desire to secure by Letters Patent of the United States—

1. The method or process of treating india-rubber or other similar gums when dissolved in chloroform (or other solvent) with caustic-ammonia gas or chloride of ammonia, for the purposes substantially as hereinbefore set forth.

2. The method or process of washing the dissolved and bleached gum, as hereinbefore set forth, with hot water, for the purpose described.

3. The method or process of distilling the dissolved and bleached gum while in the washing process or by a subsequent process, for the purposes hereinbefore set forth.

4. The method or process of redissolving the rubber or gum obtained by the foregoing operations, and combining the same phosphate of lime or a carbonate of zinc by means of pressure in hot molds, to harden the compound, for the purposes hereinbefore set forth.

FRANK MARQUARD.

Witnesses:
J. B. HOLLENBACK,
C. L. BARRITT.